United States Patent [19]

Egger

[11] 4,098,000

[45] Jul. 4, 1978

[54] CRACK OPENING DISPLACEMENT GAGE

[75] Inventor: Richard L. Egger, Bellevue, Wash.

[73] Assignee: The Boeing Company, Seattle, Wash.

[21] Appl. No.: 784,238

[22] Filed: Apr. 4, 1977

[51] Int. Cl.² .................................... G01B 5/00
[52] U.S. Cl. ................................. 33/148 D
[58] Field of Search ........... 33/143 L, 147 D, 147 N, 33/148 D, 148 J, 172 E; 73/88.5, 88 E, 89; 338/5, 6; 361/280, 292, 296

[56] References Cited

U.S. PATENT DOCUMENTS

| | | | |
|---|---|---|---|
| 1,431,638 | 10/1922 | Dowling | 33/148 H |
| 1,816,464 | 7/1931 | Biggert | 33/149 J |
| 1,958,424 | 5/1934 | Gebhard | 361/296 |
| 2,138,411 | 11/1938 | Tornebohn | 33/147 E |
| 3,221,256 | 11/1965 | Walden | 361/296 X |
| 3,702,957 | 11/1972 | Wolfendale | 361/280 |

Primary Examiner—Harry N. Haroian
Attorney, Agent, or Firm—Wolf, Greenfield & Sacks

[57] ABSTRACT

An electrical transducer for measuring changes in the size of crack openings. The device is designed to operate at temperatures up to and exceeding 1500° F., is portable, compact, easy to use and reuseable. The device comprises a differential capacitive sensing assembly, arm-like members each including an arm assembly for transmitting the change in crack opening from the crack to the sensing assembly, a flexural pivot to facilitate movement of the arm-like members with changes in the crack opening and means for anchoring the device in the crack. The differential capacitive displacement assembly comprises a plurality of capacitor plates, with the reference excitation plates coupled to one arm assembly and the movable sensing plate coupled to another arm assembly. A bridge circuit couples to the differential capacitive sensing assembly for electrically sensing capacitive variations occasioned by crack opening displacements.

8 Claims, 4 Drawing Figures

CRACK OPENING DISPLACEMENT GAGE

BACKGROUND OF THE INVENTION

The present invention relates to a crack opening displacement gage which is able to operate at elevated temperatures and has high resolution and accuracy. The device of this invention may be used in many different applications such as in the testing of fracture toughness specimens and in measuring displacement in structural joints.

There are a number of different types of devices that are presently in use for measuring crack opening displacements at moderate temperatures. The most popular type of device currently in use employs bonded resistance strain gages mounted on cantilever beams that undergo changes in strain as the crack opening changes. These devices are limited in use to a maximum temperature of about 600° F. by the fundamental characteristics of the strain gages. Crack opening displacement gages that are based on variable reluctance principles suffer to a similar degree when operated at elevated temperatures. Techniques that use deflection transmitting rods to transfer displacements from an elevated temperature environment to a more benign environment are quite cumbersome and are often unreliable and inaccurate.

The patent literature also shows some crack opening displacement devices. See for example, U.S. pat. Nos. 3,000,101; 2,732,625; 2,921,282 and 3,566,222. The devices shown in these prior art patents generally are not characterized by good resolution and accuracy especially in comparison with the device of the present invention and these prior art devices are not constructed for operation at elevated temperatures. These devices generally rely upon a variation in a gap between a pair of capacitor plates which has been found to be not as accurate a form of sensing as the sensing arrangement of the present invention. For one thing there may be many other factors that effect the gap-changing capacitive displacement sensor such as gap changes due to vibrations or temperature fluctuations. The structure of the present invention inherently compensates for these factors.

Accordingly, one object of the present invention is to provide an improved crack opening displacement gage employing an improved differential capacitive displacement sensing arrangement.

Another object of the present invention is to provide a crack opening displacement transducer that is capable of operation at elevated temperatures of even up to and exceeding 1500° F.

A further object of the present invention is to provide an electrical transducer for measuring crack opening displacements that is portable, easily attachable within an existing crack opening and reuseable even after a catastrophic failure has occurred at the crack.

Still another object of the present invention is to provide a device for measuring crack opening displacement which is simple in construction and easy to build yet is rugged and capable of precision performance.

Another object of the present invention is to provide a device for measuring crack opening displacement wherein the device is characterized by a simple means for securing the device in the crack opening.

Still another object of the present invention is to provide a crack opening displacement gage that has an improved symmetrical differential capacitive displacement sensor operating on the basis of plate area changes rather than changes in distance between capacitor plates.

SUMMARY OF THE INVENTION

To accomplish the foregoing and other objects of this invention there is provided a crack opening displacement gage which comprises a differential capacitive type sensor and a pair of arm means each having ends adapted to be disposed in the crack opening. A common pivot means intercouples the arm means at a location spaced from the ends of the arm means which are disposed in the crack opening. The arm means each include deflection means with the deflection means of each arm means moving toward and away from each other as the crack opening opens and closes. Each arm means may comprise an arm assembly referred to hereinafter as either an upper arm assembly or a lower arm assembly. In the disclosed embodiment each arm assembly comprises a forward leg disposed in the crack opening and a rear leg forming the deflection means. These legs are preferably intercoupled by a flexural pivot. In conjunction with the flexural pivot, the arm pair means serve to transfer displacement in the crack to the differential capacitive sensor. The differential capacitive sensor means includes a first plate means, at least a second plate means, means securing the first plate means to one of said deflection means and means securing the second plate means to the other deflection means so that as the deflection means move relative to one another so also do the first and second plate means to vary the facing area between these plate means. In the preferred construction of this invention there is preferably provided also a third plate means also secured to the other deflection means. The first plate means in the illustrated embodiment comprises a single symmetrically shaped sensing plate insulatedly supported from the rear leg of the upper arm assembly. In the disclosed embodiment the second and third plate means each comprise a pair of plates spacedly disposed and providing a cavity within which the sensing plate displaces. One of the pairs of plates defines an upper excitation plate assembly while the other pair of plates defines a lower excitation plate assembly. The device of this invention preferably also comprises a flexible spring disposed between the front arm of each arm assembly. This spring urges the arms away from each other and thus provides a biasing force for maintaining the entire device within the crack opening once the arms have been compressed and inserted in the crack opening.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

Figure 1:
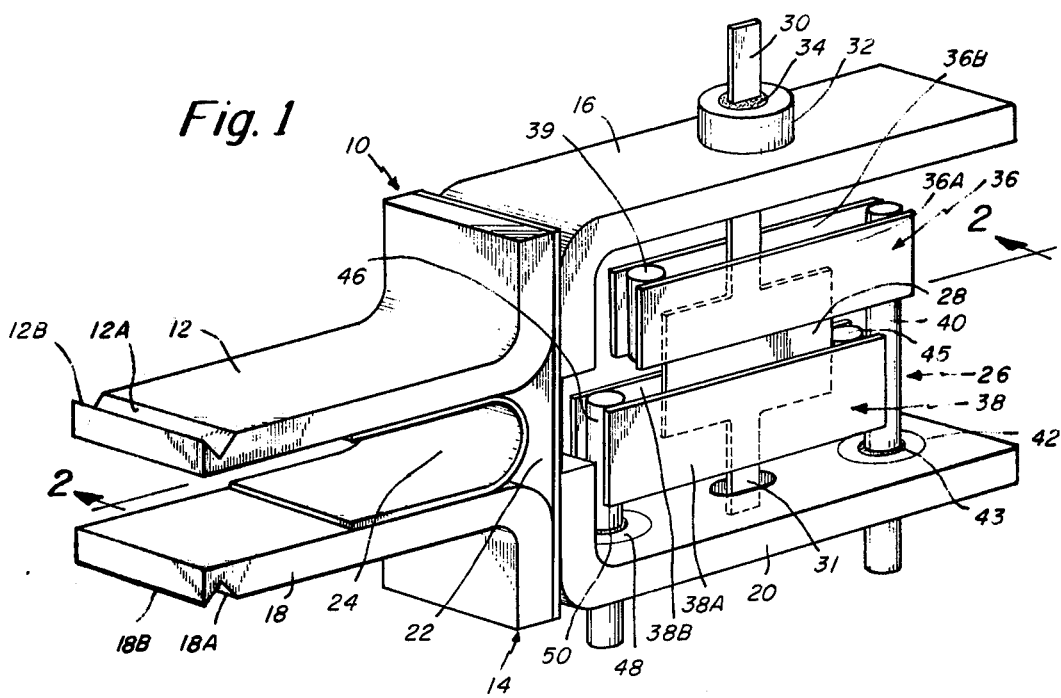
FIG. 1 is a perspective view of one preferred illustrated embodiment of the present invention.
Figure 2:
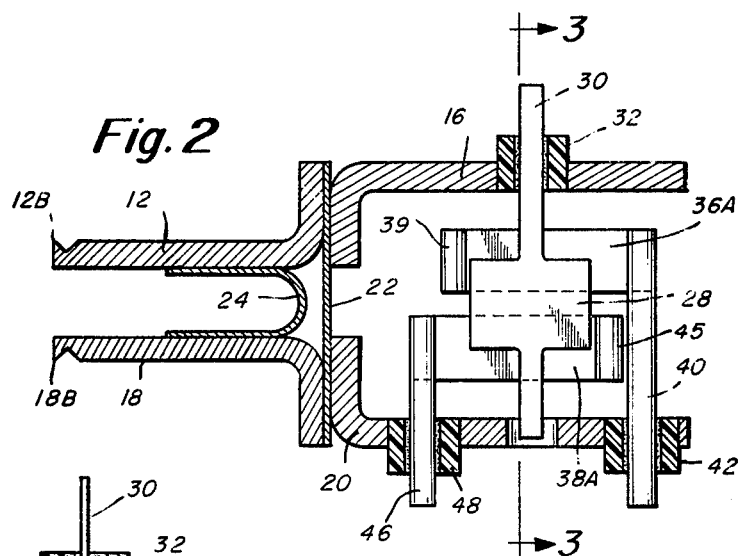
FIG. 2 is a cross sectional view taken along line 2—2 of FIG. 1.
Figure 3:
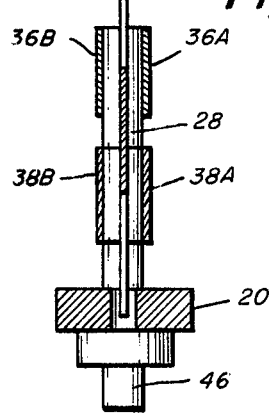
FIG. 3 is a cross sectional view taken along line 3—3 of FIG. 2 and showing in particular the detail of the differential capacitive sensor arrangement.

Referring now to FIGS. 1-3, the device generally comprises a pair of arm means including upper arm assembly 10 and lower arm assembly 14. The upper arm assembly 10 includes a front leg 12 and a rear leg 16. Similarly, the lower arm assembly 14 comprises a front leg 18 and a rear leg 20. All of the legs comprising the upper and lower arm assemblies are commonly interconnected by a flexural pivot 22. Each of the legs 12, 16, 18 and 20 may be constructed of a nickel base alloy or any other metal with structural and oxidation properties consistent with the temperature range being used. Materials that may be used include INCONEL X-750, RENE-41 or even 300 series stainless steel. The flexural pivot 22 may also be constructed of the same material but is heat treated to produce high temperature spring qualities. Also, of course, the pivot 22 is made of a thinner construction than the legs of the arm assembly.

The forward arms 12 and 18 each have respective grooves 12A and 18A defining accurately dimensioned end edges 12B and 18B. These edges are the edges that contact within the crack opening.

A U-shaped spring 24 is securely disposed between the facing surfaces of the arms 12 and 18. The spring 24 may be constructed of the same material as the pivot 22 and all of the arms. The pivot and the spring may be suitably connected to the arms by welding.

The differential capacitive sensor 26 essentially interconnects between the rear arms 16 and 20 and comprises a symmetrically shaped sensing plate 28 having a rectangular center section and oppositely extending symmetrical legs 30 and 31. Leg 31 extends through an accommodating aperture in the rear leg 20 while leg 30 is rigidly supported in a ceramic insulator 32. This ceramic insulator may be constructed of a ceramic oxide material such as aluminum oxide. The leg 30 extends through the insulator and is maintained in place by a ceramic adhesive 34 which may be a high temperature ceramic oxide adhesive that is commercially available. It is noted that the leg 30 extends a sufficient distance above the insulator 32 and effectively forms a sensing lead terminal.

The differential capacitive sensor 26 also comprises upper excitation plate assembly 36 and lower excitation plate assembly 38. The upper excitation plate assembly comprises rectangular plates 36A and 36B spacedly disposed by means of heavy gage wires 39 and 40. Both of these wires as well as the wires of the lower excitation plate assembly may be, for example, 0.04 inches diameter with the wire 40, as shown, having a length longer than the wire 39. The wire 39 preferably has a length substantially the same as the shorter dimension of each of the plates 36A and 36B. The wire 40 is supported from the lower rear arm 20 in a ceramic insulator 42 and also with the use of a ceramic adhesive 43. It is noted that the wire 40 extends below the arm 20 thus forming an attaching lead terminal. Thus, the wires 39 and 40 effectively form a dual function of a spacer and a connecting terminal for the device.

The lower excitation plate assembly 38 is of substantially the same construction as the upper excitation plate assembly and comprises rectangular plates 38A and 38B which are spacedly disposed by means of the wires 45 and 46. The wire 46 is supported similarly to the wire 40 with a ceramic insulator 48 and a ceramic adhesive 50. The wire 46 has a length longer than the wire 45 but somewhat shorter than the wire 40. All of the plates comprising the plate assemblies and the sensing plate 28 may be constructed of a similar material to the arm assemblies such as a nickel base alloy. Spot welding may be used for connecting the plates to their respective wires.

The pairs of plates 36A, 36B and 38A, 38B each define cavities or enclosures with the sensing plate 28 disposed essentially at the midpoint thereof as clearly shown in FIG. 3. The dielectric media between the plate 28 and the plate assemblies 36 and 40 may be a vacuum or a gas such as air wherein the dielectric media effects will be essentially uneffected by temperature.

Figure 4:
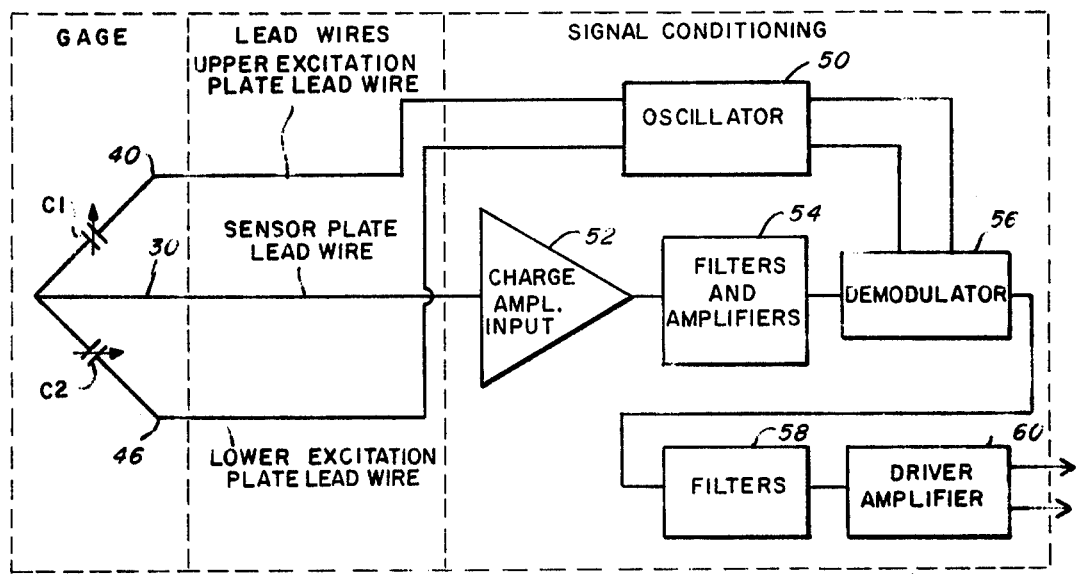
FIG. 4 is a schematic block diagram of electronic circuitry associated with the device for registering an indication of displacement.

The device of this invention is quite simple to use and may be inserted in a crack by compressing the arms 12 and 18 against the bias of the spring 24. Once the device is in position, any changes in the crack opening dimension transferred by the arm assemblies to the differential capacitor displacement sensor cause the sensing plate 28 to move further into one excitation plate assembly and out of the other excitation plate assembly. In this manner, the capacitance C1 between the sensing plate and one excitation plate assembly increases while the capacitance C2 between the sensing plate and the other excitation plate assembly decreases. Alternatively, if the movement is in the other direction, then the inverse occurs. FIG. 4 shows the differential capacitor as C1 and C2 along with the corresponding leads 30, 40 and 46 also shown in FIGS. 1-3. These capacitors are connected as an electrical halfbridge with appropriate electronic circuitry shown in FIG. 4 to produce an electrical analog signal indicative of the change in the crack opening dimension. This signal conditioning circuitry includes an oscillator 50, an amplifier 52, filters and additional amplifiers 54, demodulator 56, filters 58, and a driver amplifier 60. FIG. 4 is a conventional circuit and only one of a number of different circuits that may be used with the device of this invention.

The gage can be mounted in a manner previously mentioned with the use of the spring 24. The spring forces the arms against the crack edge thus holding the gage mounted in the crack. A more positive connection with the crack may be used and employs auxiliary knife edges mounted on the specimen. Also, the arms of the device may be spot welded within the crack or an adhesive may be used.

The device of the present invention is characterized by a number of important features. For example, as previously mentioned the construction of the device permits operation at temperatures up to and exceeding 1500° F. The range of the device is preferably on the order of 0.050 inch and for this range the resolution is 0.1%. The device of this invention can be constructed quite small. For example, in one model the front to rear dimension is 1 ½ inch, the height is ¾ inch and the device is only ¼ inch wide.

Another important feature of the present invention is the symmetry of the mechanical and electrical design. Because of this symmetry undesired mechanical and electrical effects are readily cancelled. For example, assume the main sensing plate 28 moves closer to one of the plates such as plate 36A so that the plate 28 is not at the midpoint between the plates 36A and 36B. This would not materially effect the reading because the change in capacitance in one direction would be offset by an opposite change with regard to the other plate.

The cavity construction of the upper and lower excitation plate assemblies is also an important feature. This construction tends to reduce noise and at the same time increases the effective capacitance thus increasing the sensitivity of the device.

As mentioned previously the device of the present invention relies on an area change for sensing rather than a gap change. Further, any capacitive gap changes tend to be compensated for so as to keep the sensitivity and signal constant.

In the drawings a spring 24 has been shown. However, it is possible to operate the device without the spring 24 although its presence is preferred. The flexural pivot provides a common pivot for the arm assemblies and also provides a very low friction and negligible hysteresis.

The construction of the present invention also provides for inherent compensation during temperature changes. This is due to the symmetrical arrangement of the differential capacitive sensor, the use of pairs of plates for each plate assembly and to the arrangement of the sensor within the rear legs.

Another important feature of the present invention is the physical separation of the sensing plate insulator, 32 from the excitation plate insulators 42 and 48. In this way noise is reduced and there is increased stability at elevated temperatures. Additionally, the use of an electrically conductive medium between the sensing plate insulator 32 and the excitation plate insulators 42 and 48 limits the dependency of the device on the electrical properties of the ceramic, resulting in improved stability particularly at elevated temperature.

Having described one embodiment of the present invention it should now become apparent to those skilled in the art that numerous modifications can be made in the structure shown in the drawings and that all such modifications contemplated as falling within the scope of the present invention are limited only by the dependent claims.

What is claimed is:

1. A crack opening displacement gage comprising;
   a pair of front legs each having an end adapted to be disposed in the crack opening,
   a pair of rear legs having ends that extend away from the front legs,
   common pivot means including a flexural planar pivot having the pairs of legs supported therefrom on opposite respective sides thereof,
   said rear legs moving toward and away from each other as the crack opening opens and closes,
   and differential capacitive sensor means disposed between said rear legs including a sensing plate, means for supporting said sensing plate from one of said rear legs with the sensing plate extending between the rear legs, an upper excitation plate assembly comprising a pair of spaced plates extending parallel to said sensing plate on opposite sides thereof and means for supporting said plates from the other rear leg and forming a cavity therebetween in which at least a part of the sensing plate extends, and a lower excitation plate assembly disposed coplanar with the upper excitation plate assembly and also comprising a pair of spaced plates extending parallel to said sensing plate on opposite sides thereof and means for supporting said plates from the other rear leg and forming a cavity therebetween in which at least a part of the sensing plate extends.

2. A gage as set forth in claim 1 including a spring means disposed between said front legs for urging the ends of the front legs apart.

3. A gage as set forth in claim 2 wherein said spring means includes a U-shaped spring disposed adjacent the pivot means.

4. A gage as set forth in claim 1 wherein all support means for the sensing plate and excitation plate assemblies include thermal insulation means.

5. A gage as set forth in claim 1 wherein said means for supporting the plates of each assembly include a support member and further including a second member associated with each pair of plates for in part defining the cavity and supporting the plates in fixed spaced apart relation.

6. A gage as set forth in claim 5 wherein the support member for the upper assembly is longer than the support member for the lower assembly.

7. A gage as set forth in claim 1 wherein the sensing plate is symmetrical between the rear legs.

8. A gage as set forth in claim 1 wherein the other rear leg has means for receiving the non-supported end of the sensing plate.

* * * * *